(12) United States Patent
Glenn et al.

(10) Patent No.: US 7,571,075 B2
(45) Date of Patent: Aug. 4, 2009

(54) COMPUTERIZED PLANT SELECTION SYSTEM

(75) Inventors: Matthew K. Glenn, San Francisco, CA (US); David L. Wilkins, San Jose, CA (US)

(73) Assignee: Plant Sense, Inc., San Francisco, CA (US)

( * ) Notice: Subject to any disclaimer, the term of this patent is extended or adjusted under 35 U.S.C. 154(b) by 0 days.

(21) Appl. No.: 11/712,119

(22) Filed: Feb. 28, 2007

(65) Prior Publication Data

US 2007/0208592 A1    Sep. 6, 2007

Related U.S. Application Data

(60) Provisional application No. 60/778,214, filed on Mar. 2, 2006.

(51) Int. Cl.
| | |
|---|---|
| *G21C 17/00* | (2006.01) |
| *G01W 1/00* | (2006.01) |
| *A01C 1/00* | (2006.01) |
| *G06Q 20/00* | (2006.01) |

(52) U.S. Cl. .............. 702/182; 702/2; 702/3; 47/1.7; 47/58.1 R; 47/58.1 SC; 705/1

(58) Field of Classification Search .......... 702/2, 702/3, 19, 182; 47/1.7, 58.1 R, 58.1 SC; 705/1
See application file for complete search history.

(56) References Cited

U.S. PATENT DOCUMENTS

| | | | | |
|---|---|---|---|---|
| 4,069,716 A | | 1/1978 | Vanasco et al. | ............. 73/432.1 |
| 4,445,788 A | * | 5/1984 | Twersky et al. | ............. 374/142 |
| 4,931,775 A | | 6/1990 | Sheriff | .......... 340/604 |
| 5,031,358 A | * | 7/1991 | Sussman | ........... 47/58.1 R |
| 5,621,669 A | * | 4/1997 | Bjornsson | .............. 702/85 |
| 5,764,819 A | | 6/1998 | Orr et al. | ............. 382/110 |
| 5,809,440 A | | 9/1998 | Beck et al. | ............. 701/50 |
| 5,857,289 A | | 1/1999 | Franco da Encarnacao | .... 47/79 |
| 5,887,491 A | * | 3/1999 | Monson et al. | .......... 73/864.74 |
| 5,971,273 A | | 10/1999 | Vallaire | .............. 235/381 |
| 6,016,713 A | | 1/2000 | Hale | ............ 73/864.45 |
| 6,058,647 A | | 5/2000 | Emalfarb | ............ 47/1.01 R |
| 6,070,539 A | | 6/2000 | Flamme et al. | ............. 111/177 |

(Continued)

OTHER PUBLICATIONS

Phytech, Ltd., "Introduction to Phytomonitoring," http://web.archive.org/web/20060301024249/http://www.phytech.co.il/introduction.html, 6 pages, Mar. 1, 2006.

*Primary Examiner*—Eliseo Ramos Feliciano
*Assistant Examiner*—Janet L Suglo
(74) *Attorney, Agent, or Firm*—Scot A. Reader

(57) ABSTRACT

A computerized plant selection system comprises a probe and a computer. The probe is installed at a proposed site for a plant. The probe collects environmental data at the site. The environmental data are uploaded to a computer. The computer identifies one or more compatible plant species using the environmental data. Information regarding the compatible plant species is displayed to a user, which advantageously enables the user to select a plant that is environmentally compatible with the proposed site. The compatible plant species may be further identified using user interview data, which enables the user to advantageously select a plant that is compatible with the user's aesthetic and utilitarian preferences. The computer may further identify purchasing information, which advantageously saves the user time and effort in locating a plant and enables the user to purchase a plant that is compatible with the user's budget.

16 Claims, 9 Drawing Sheets

U.S. PATENT DOCUMENTS

| | | | | |
|---|---|---|---|---|
| 6,082,045 A | 7/2000 | Weder et al. | | 47/72 |
| 6,178,253 B1 | 1/2001 | Hendrickson et al. | | 382/110 |
| 6,182,497 B1 * | 2/2001 | Krajci | | 73/23.2 |
| 6,212,824 B1 | 4/2001 | Orr et al. | | 47/58.1 R |
| 6,327,569 B1 | 12/2001 | Reep | | 705/1 |
| 6,549,851 B2 | 4/2003 | Greensides | | 702/2 |
| 6,701,665 B1 | 3/2004 | Ton et al. | | 47/58.1 R |
| 6,725,598 B2 | 4/2004 | Yoneda et al. | | 47/60 |
| 6,862,083 B1 | 3/2005 | McConnell et al. | | 356/4.01 |
| 6,947,810 B2 | 9/2005 | Skinner | | 700/283 |
| 6,975,236 B2 | 12/2005 | Staples | | 340/602 |
| 7,110,862 B2 | 9/2006 | Park | | 700/284 |
| 7,162,438 B1 * | 1/2007 | Kelly et al. | | 705/26 |
| 7,167,372 B2 | 1/2007 | Mori et al. | | 361/731 |
| 7,231,298 B2 | 6/2007 | Hnilica-Maxwell | | 702/3 |
| 7,231,815 B2 | 6/2007 | Kanare | | 73/73 |
| 7,275,042 B1 * | 9/2007 | Kelly | | 705/26 |
| 2002/0059186 A1 | 5/2002 | Weber et al. | | 707/1 |
| 2002/0169514 A1 | 11/2002 | Eryurek et al. | | 700/110 |
| 2002/0170229 A1 * | 11/2002 | Ton et al. | | 47/1.7 |
| 2003/0005626 A1 | 1/2003 | Yoneda et al. | | 47/69 |
| 2003/0182260 A1 | 9/2003 | Pickett et al. | | 707/1 |
| 2004/0030606 A1 * | 2/2004 | Park | | 705/26 |
| 2004/0215556 A1 * | 10/2004 | Merkley et al. | | 705/38 |
| 2004/0231240 A1 | 11/2004 | Kuiper et al. | | 47/62 R |
| 2005/0050796 A1 | 3/2005 | Wilkin | | 47/58.1 SE |
| 2005/0081441 A1 | 4/2005 | Mantovani | | 47/67 |
| 2005/0165551 A1 | 7/2005 | Hnilica-Maxwell | | 702/1 |
| 2005/0178058 A1 | 8/2005 | Rudolph | | 47/60 |
| 2006/0282315 A1 | 12/2006 | Brennan | | 705/14 |
| 2007/0082600 A1 * | 4/2007 | Asvestas et al. | | 454/191 |

* cited by examiner

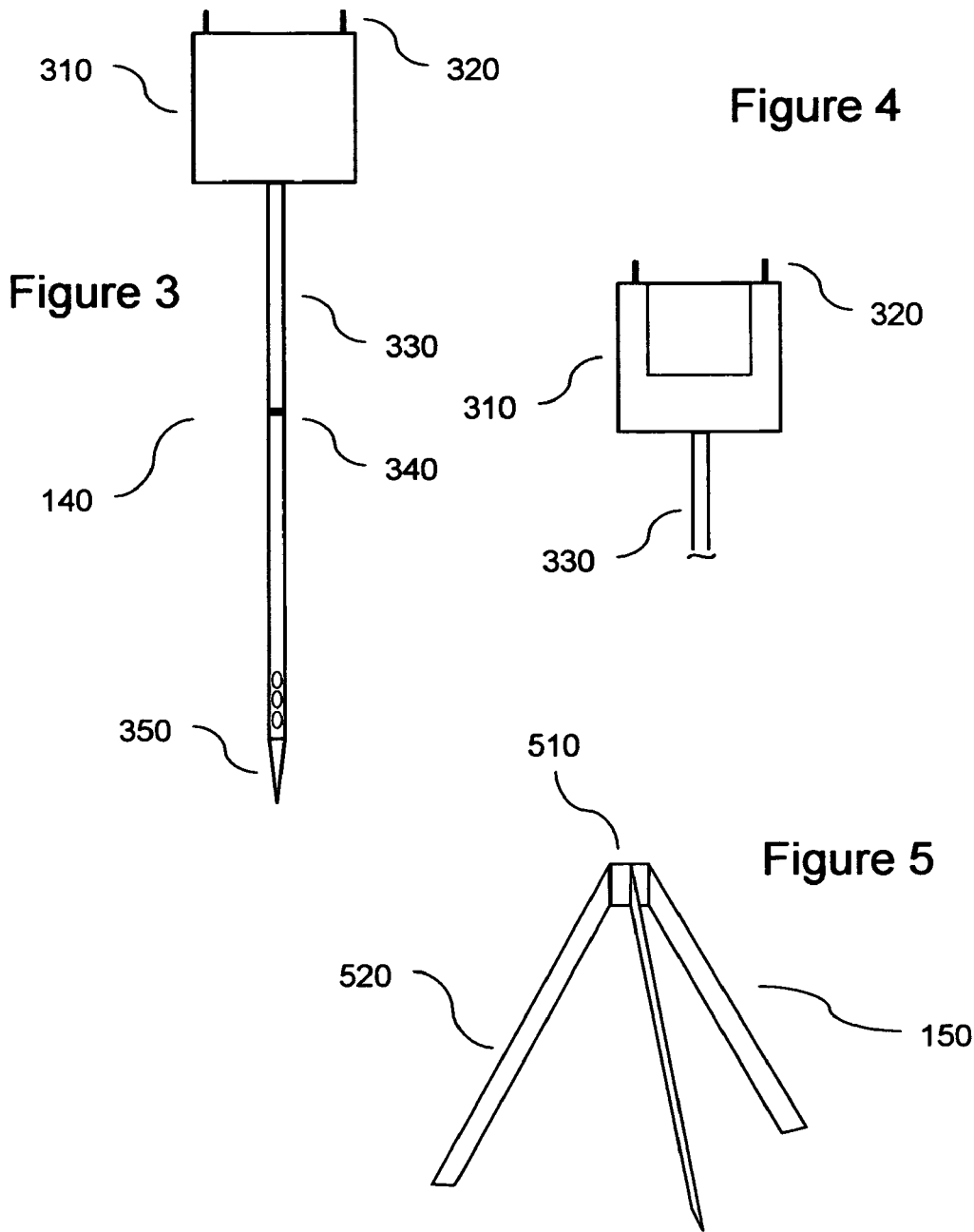

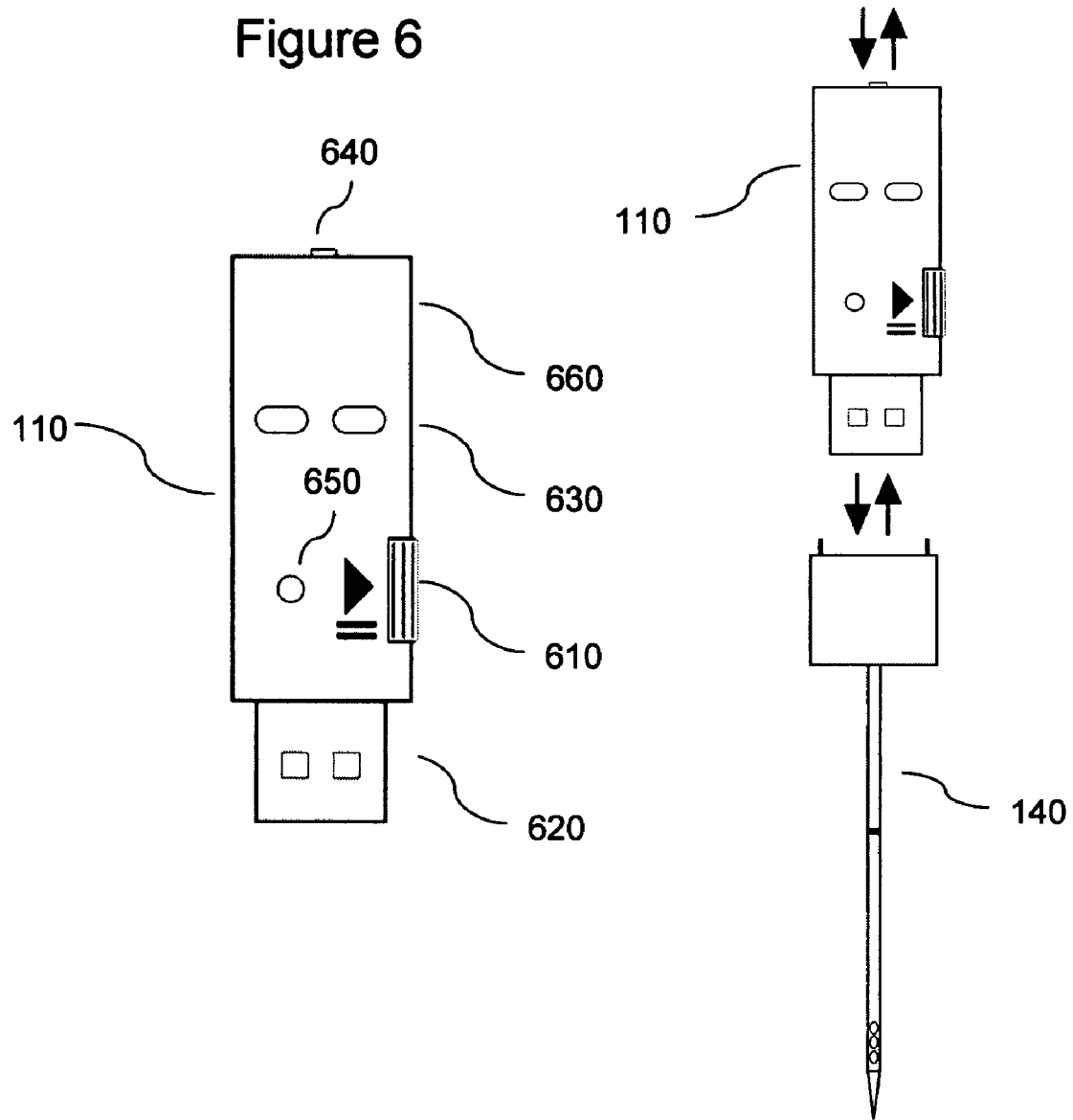

US 7,571,075 B2

COMPUTERIZED PLANT SELECTION SYSTEM

CROSS-REFERENCE TO RELATED APPLICATIONS

This application claims the benefit of U.S. provisional application No. 60/718,214 entitled "Computerized Plant Selection and Health Maintenance System," filed on Mar. 2, 2006. This application has subject matter related to U.S. nonprovisional application Ser. No. 11/712,037 entitled "Probe for Plant Selection and Health Maintenance System," Ser. No. 11/712,118 entitled "Computerized Plant Health Diagnostics System," Ser. No. 11/712,273 entitled "Real-Time Plant Health Monitoring System" and Ser. No. 11/712,017 entitled "Computerized System for Targeted Horticultural Advertising," all of which have a filing date concurrent herewith and are incorporated herein by reference.

BACKGROUND OF INVENTION

The present invention relates to plant performance optimization and, more particularly, to a computerized system for plant selection.

Plant heath is highly dependent on compatibility of plant species with local environmental conditions, such as light, temperature, humidity, soil moisture and soil pH. Determining compatibility of plant species with local environmental conditions is, however, a complex problem. The sheer diversity of plant species makes determining the universe of plant species that will thrive in a given environment a daunting challenge that is beyond the capabilities of the typical home gardener. The task of determining local environmental conditions with sufficient precision to make intelligent judgments about plant selection is also formidable. Due to these and other difficulties in determining plant-environment compatibility, plants are often selected based on non-scientific perceptions about species characteristics and local environmental conditions, with selected plants often experiencing poor health as a result. Moreover, even where a compatible plant is identified, the home gardener and horticultural professional must expend considerable effort to locate and purchase the compatible plant.

SUMMARY OF THE INVENTION

The present invention provides a computerized plant selection system. In some embodiments the system comprises a probe and a computer. The probe is installed at a proposed site for a plant. The probe collects environmental data at the site. The environmental data are uploaded to a computer. The computer identifies one or more compatible plant species using the environmental data. Information regarding the compatible plant species is displayed to a user, which advantageously enables the user to select a plant that is environmentally compatible with the proposed site.

In some embodiments the environmental data include data indicative of plant-environment compatibility, such as light intensity, temperature, humidity, soil moisture and soil pH.

In some embodiments the probe has a portable controller for storing the environmental data. The controller is removed from the probe and connected to the computer for uploading the environmental data. The probe has a USB connector for connecting the controller to the computer.

In some embodiments the compatible plant species are further identified using user interview data. The computer conducts an interview with the user to collect information indicative of plant-user compatibility, such as color and maintenance requirements. The computer identifies the compatible plant species using the environmental data and the user interview data. Information regarding the compatible plant species is displayed to the user, which enables the user to advantageously select a plant that is compatible with the user's aesthetic and utilitarian preferences.

In some embodiments the computer identifies purchasing information, such as retailer information and pricing information, for one or more of the identified compatible plant species, which advantageously saves the user time and effort in locating a plant and enables the user to purchase a plant that is compatible with the user's budget.

In some embodiments the computer has client software installed thereon for facilitating upload of the environmental data to the computer, identifying the compatible plant species, identifying the purchasing information and displaying the compatible plant species and purchasing information. The client software may interact with the controller for uploading of the environmental data to the computer, may interact with a plant database for identifying the compatible plant species, may interact with a user interface for displaying the compatible plant species and may interact with an advertising portal for identifying the purchasing information. The plant database and the advertising portal may be hosted at a website remote from the client software.

These and other aspects of the invention will be better understood by reference to the following detailed description taken in conjunction with the drawings that are briefly described below.

BRIEF DESCRIPTION OF THE DRAWINGS

FIG. 3 shows a soil mount for such a probe.

FIG. 4 is a cross section of a soil mount for such a probe.

FIG. 5 shows a stand for such a probe.

FIG. 6 shows a controller for such a probe.

FIG. 7 is an exploded view of such a probe illustrating how it is assembled.

DETAILED DESCRIPTION OF A PREFERRED EMBODIMENT

Generally speaking, the present invention features a hardware and software system and components thereof that are used to determine horticultural compatibility with environmental conditions that are prevalent in a particular location. The system in some embodiments recommends a plant species for the particular location and a retailer from whom the plant species may be purchased. The system in some embodiments diagnoses an environmental condition adverse to the health of a plant that is installed at a particular location and recommends changes to the environment to improve the health of the plant. The system in some embodiments monitors in real-time for an environmental condition adverse to the health of a plant that is installed in a particular location and outputs alerts. The system in some embodiments addresses a probe adapted for use in such a system to reliably collect, process, store and transmit environmental data and output alarms.

Figure 1:
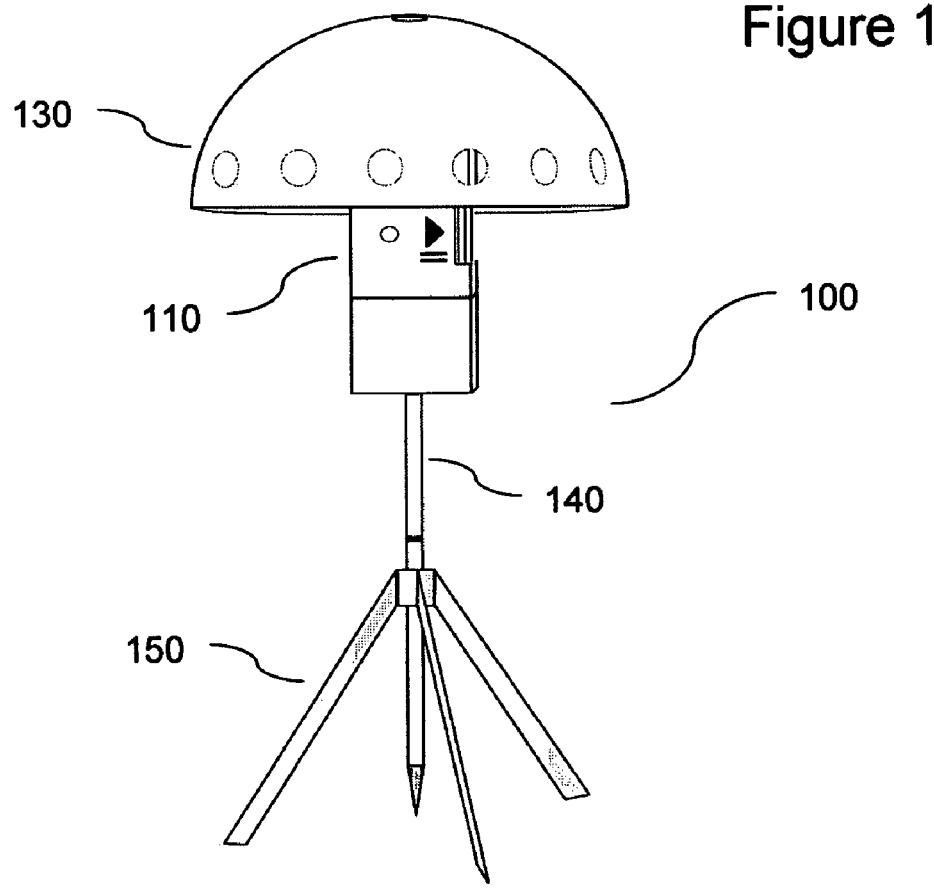
FIG. 1 shows a probe adapted for use in a computerized plant selection and health maintenance system in one embodiment of the invention.

FIG. 1 illustrates a probe 100 in one embodiment of the invention. Probe 100 has a modular design that permits easy assembly and disassembly. The modularity of probe 100 is also advantageous in that it enhances the portability of a controller 110 which houses data, interfaces and logic critical to system operation and which is physically transported during system operation between probe 100 and a personal computer. Modular elements of probe 100 are shown in FIGS. 2 through 7 and include controller 110, a shield 130, a soil mount 140 and a stand 150. Stand 150 is used in applications where probe 100 is mounted on a hard surface, such as a building floor. The geometry of probe 100, generally speaking, resembles a mushroom, which provides the desired functions while appealing to a horticultural aesthetic sensibility.

Figure 2:
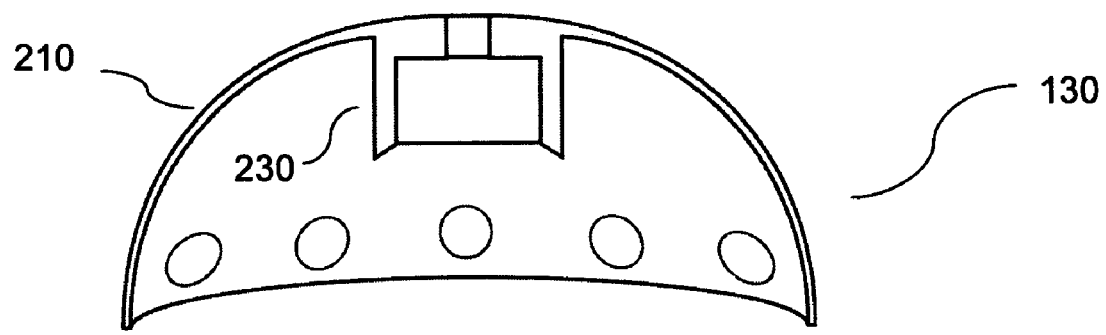
FIG. 2 is a cross section of a shield for such a probe.

Turning to FIG. 2, shield 130 is shown in more detail. Shield 130 serves as a protective cap for controller 110, which houses sensitive electronics. Shield 130 is generally semi-hemispherical. Shield 130 has a shell 210 adapted to reduce exposure of controller 110 to environmental hazards, such as thermal radiation, moisture and dirt, when engaged with controller 110. Shell 210 is sized and shaped to shed water droplets away from controller 110, enhancing the durability of controller 110. Shell 210 also reduces exposure of controller 110 to direct sunlight, enabling temperature readings by a temperature sensor on controller 110 that are near ambient. Without shell 210, direct sunlight could heat controller 110 well above ambient temperature and could record temperatures much higher than ambient.

Inside of shell 210 is a receptacle 230 for coupling shield 130 with controller 110. Receptacle 230 has an interior cross section that matches the cross section of controller housing 660 such that controller housing 660 snugly engages with shield 130 when controller housing 660 is slid into receptacle 230. Similarly, controller 110 disengages with receptacle 230 when controller housing 660 is pulled from receptacle 230. Shell 210 has a hole in the top to expose a light sensor 846 operative in controller 110 beneath a bezel 640 to direct sunlight when controller 110 and shield 130 are engaged. The snug fit between controller 110 and shield 130 helps prevent water entering the hole from reaching lower regions of controller 110. Portions of cap 130 that are exposed to direct sunlight may be white in color to resist thermal absorption.

Turning to FIG. 3, soil mount 140 is shown in more detail. Soil mount 140 has a protective receptacle 310 with contacts 320 projecting upward therefrom and a stake 330 projecting downward therefrom. Holes near the bottom of stake 330 house soil sensors 848. Soil sensors 848 include a soil moisture content sensor and a soil pH sensor. Extending from the bottom of stake 330 below soil sensors 848 is a prong 350. When installed in a natural environment, probe 100 is mounted by pushing prong 350 through the surface of the ground near the actual or prospective location of a plant until stake 330 is submerged below the ground to the level of a depth mark 340 on stake 330. Depth mark 340 identifies a recommended submersion depth for soil mount 140. Depth mark 340 is placed at a location along stake 330 that, if heeded by the installer of probe 100, permits soil sensors 848 to take accurate measurements of soil moisture content and pH and maintains a sufficient height of receptacle 310 above ground to both prevent ground water from reaching receptacle 310 and minimize the exposure of receptacle 310 to rain and sprinkler droplets reflected from the ground. Soil sensors 848 are communicatively coupled with contacts 320 via conductors that traverse receptacle 310 and the interior of stake 330.

Referring now to FIG. 4, engagement of soil mount 140 and controller 110 is further explained. Receptacle 310 has an interior cross section and a depth that match the exterior cross section and exposed length of a USB connector 620 that projects downward from controller housing 660 such that controller 110 snugly engages with soil mount 140 when USB connector 620 is slid into receptacle 310. Similarly, controller 110 disengages with receptacle 310 when USB connector 620 is pulled from receptacle 310. When controller 110 is engaged with receptacle 310, contacts 320 mate with conductors internal to controller 110 through holes in the lower surface of controller housing 660 to communicatively couple controller 110 with soil sensors 848. The snug fit between controller 110 and soil mount 140 helps prevent moisture and other contaminants from reaching contacts 320 and USB connector 620.

Turning to FIG. 5, stand 150 is shown in greater detail. Stand 150 is used in applications where probe 100 is mounted on a hard surface, such as a building floor, shelf, or table. Stand 150 has three legs 520 and a clamp 510. Clamp 510 engages with cylinder 330 at a point along cylinder 330 that ensures prong 350 is suspended above floor level, enabling legs 520 to support probe 100 when soil is not present. Naturally, measurements from soil sensors 848 are not generally available when probe 100 is supported in this manner.

Referring now to FIG. 6, controller 110 is shown in more detail. Controller housing 660 has an on/off button 610 that is depressed by the user to activate and deactivate controller 110. Controller 110 has a USB connector 620 projecting from the bottom of controller housing 660. USB connector 620 provides a communications interface over which data may be uploaded to a personal computer and download to controller 110. Controller housing 660 also has air vents 630 that enable water vapor but not water droplets to enter controller 110, which may be realized by lining air vents 630 with a breathable membrane such as GORE-TEX®. Allowing water vapor but not droplets to penetrate air vents 630 advantageously enables a humidity sensor 844 internal to controller 110 to measure ambient humidity accurately without subjecting components inside controller 110 to undue moisture. Controller housing 660 further has a transparent bezel 640 enabling a light sensor 846 within controller 110 to receive direct sunlight and measure light intensity. Controller housing 660 also includes a status display 650. In some embodiments status display 650 is a light emitting diode that provides a visual indication of an alarm condition. Controller 110 additionally includes a temperature sensor 842 internal to controller 110 for collecting temperature data. Controller 110 may also include a loudspeaker 870 for providing audible indications of an alarm condition. Controller 110 also includes a power supply, such as batteries.

FIG. 7 shows how probe 100 is assembled. Controller 110 is typically pushed by hand into shield 130, or vice versa, until controller housing 660 becomes snugly engaged with receptacle 230. Similarly, controller 110 is typically pushed by hand into soil mount 140, or vice versa, until USB connector 620 becomes snugly engaged with receptacle 310. Because receptacles 230, 310 are sized to match the portions of controller 110 with which they mate, assembly and disassembly may be performed without the need for tools or independent attachment or tightening mechanisms. In some embodiments, receptacles 230, 310 are made of a rubberized material that ensures a high quality seal between receptacles 230, 310 and controller 110 and prevents scratching of controller 110 during attachment and detachment.

Figure 8:
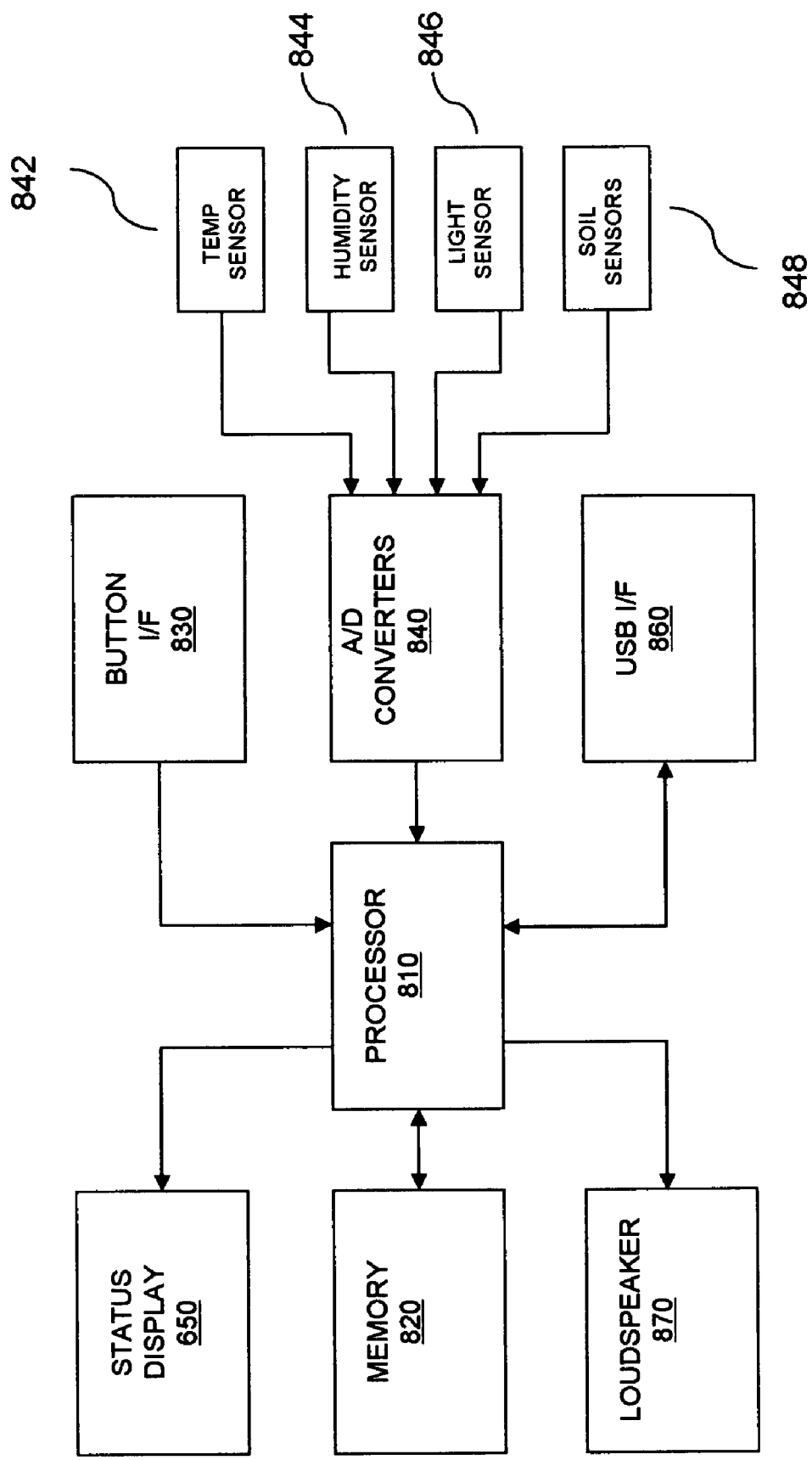
FIG. 8 is a block diagram of controller logic and sensors for such a probe.

FIG. 8 shows the logic operative within controller 110. Controller 110 includes a processor 810, which is communicatively coupled between a memory 820, a button interface 830, analog-to-digital (A/D) converters 840, status display 650, USB interface 860 and a loudspeaker 870. Processor 810 may be an application specific integrated circuit or a microcontroller, for example. Memory 820 may be a random access memory (RAM). A user turns controller 110 "on" by depressing button 610 causing processor 810 to receive an "on" command via button interface 830 and power-up controller 110. Generally speaking, a user turns controller 110 "on" when controller 110 is either installed at a prospective or actual site of a plant or is connected to a personal computer via USB connector 620. When a user turns controller 110 "on" and USB connector 620 is not connected, sensors 842, 844, 846, 848 begin taking analog readings of their respective environmental parameters and the environmental data are digitized in A/D converters 840 en route to processor 810. Environmental parameters that are measured by sensors 842, 844, 846, 848 represent influential factors affecting plant-environment compatibility, such as light, temperature, humidity, soil moisture and soil pH. In some embodiments, processor 810 processes the environmental data and stores them in memory 820 for later transmission to personal computer via USB interface 860 to facilitate plant selection or plant health diagnostics. Processing includes, for example, time-stamping the environmental data and performing mathematical corrections. For example, when the Sun is low in its zenith, light intensity readings recorded by light sensor 846 may be artificially low and require cosine correction. In some embodiments, processor 810 runs an algorithm that uses the time stomp applied to readings recorded by light sensor 846 to cosine correct the light sensor readings. In some embodiments, processor 810 determines in real-time whether the environmental data are in conformance with a species profile for an installed plant, and causes an alert to be output on status display 650 and/or loudspeaker 870 if there is nonconformance to facilitate real-time health monitoring. When a user turns controller 110 "on" and USB connector 620 is connected, processor 810 assists uploading or downloading of data to or from a personal computer via USB interface 860. In some embodiments, processor 810 assists upload of environmental data from memory 820 to the personal computer to facilitate plant selection or plant health diagnostics. In some embodiments, processor 810 assists download of species profiles for installed plants from the personal computer to memory 820 to facilitate real-time health monitoring. A user turns controller 110 "off" by depressing button 610 causing processor 810 to receive an "off" command via button interface 830 and power-down controller 110. Generally speaking, a user turns controller 110 "off" after sufficient environmental data have been collected by probe 100 or controller 110 is not in use.

In some embodiments controller 110 may further include a GPS receiver. Location information acquired by a GPS receiver may be used, after upload of the location information to a personal computer as hereinafter explained, to identify an appropriate one of regional plant databases 960, provide product and service information targeted to a user's geographic location or provide a map showing where probe 100 is installed. Alternatively, a user may provide location information through inputs on a personal computer to enable one or more of these features. Time information acquired by a GPS receiver may be used to automatically turn controller 110 "on" and "off" at designated times, for example.

Figure 9:
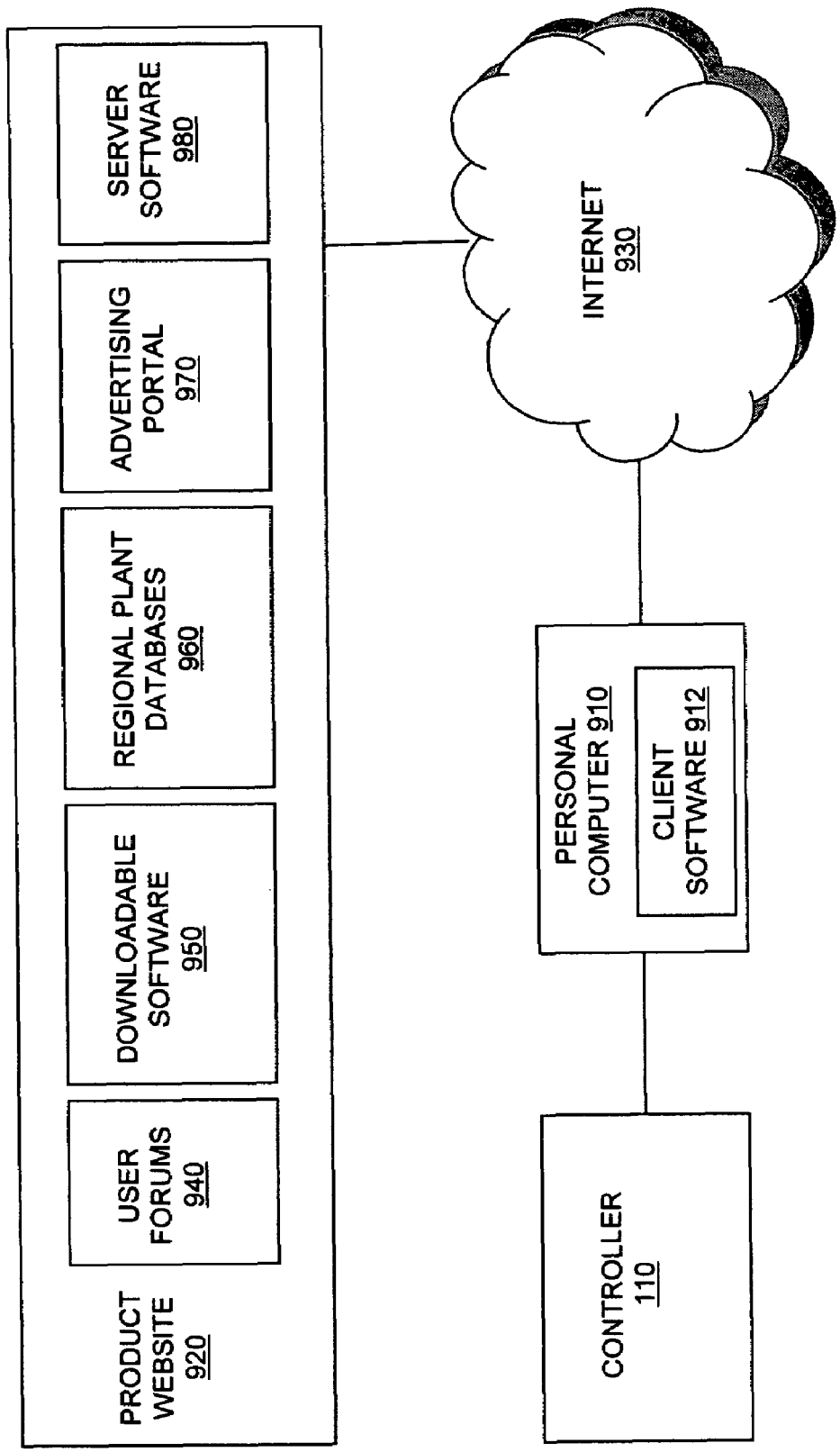
FIG. 9 shows a network adapted for use in a computerized plant selection and health maintenance system in one embodiment of the invention.

Turning to FIG. 9, a network adopted for use in a computerized plant selection and health maintenance system in one embodiment of the invention is shown. In the network, controller 110 is connected to personal computer 910 via USB connector 620 to enable uploading of collected environmental data and downloading of species profiles as well as configuration updates, such as updates to the operating system running on controller 110. Personal computer 910 has client software 912 installed thereon for accessing controller 110 via the USB connection and accessing product website 920 via the Internet 930. Product website 920 hosts user forums 940, downloadable software 950, regional plant databases 960, an advertising portal 970 and server software 980. Client software 912 may be included within downloadable software 950 and downloaded to personal computer 910 using a standard web browser, such as Microsoft Internet Explorer®. In some embodiments, an Internet capable computing device other than a personal computer, such as workstation or personal data assistant (PDA), may be employed in the instant computerized system.

Each one of regional plant databases 960 includes species profiles for plant species germane to a particular geographic region. A species profile includes, for example, an association between a plant species and an optimal environment for the plant species over various environmental parameters, such as light, temperature, humidity, soil moisture and soil pH. For simplification, an optimal environment may be expressed in terms of discrete selection parameter values. In some embodiments, the environmental parameters and corresponding selection parameters are as follows:

TABLE

Selection Parameters for Environmental Parameters

| Environmental Parameter | Selection Parameters |
| --- | --- |
| Light | Full sun |
|  | Partial sun/indirect sun |
|  | Partial shade |
|  | Shade |
| Temperature | Hot |
|  | Mild |
|  | Cold |
|  | Freeze |
| Humidity | Humid |
|  | Normal |
|  | Dry |
| Soil Moisture | Mostly wet/wet then dry (draining) |
|  | Mostly damp/damp then dry (draining) |
|  | Mostly dry |
| Soil PH | Acidic |
|  | Neutral/balanced |
|  | Basic |

In some embodiments client software 912 or server software 980 converts the selection parameter values in species profiles to numerical values so that species profiles can be compared with environmental data collected by controller 110. In some embodiments client software 912 or server software 980 converts numerical values in environmental data collected by controller 110 to selection parameter values so that species profiles can be compared with environmental data. In some embodiments one or more regional plant databases 960 suitable for a user's geographic location are installed on personal computer 910 for localized access. Species profiles may also include additional information about the plant species, such as color information, for example.

In some embodiments client software 912 facilitates plant selection. In these embodiments client software 912 analyzes environmental data uploaded from controller 110 and outputs plant selection recommendations to a user on a user interface of personal computer 910. Plant selection recommendations are output after the environmental data are cross-referenced against species profiles in one of regional plant databases 960, which may be accessed locally on personal computer 912 or remotely on product website 920. A plant selection recommendation identifies one or more plant species compatible with the environmental data. A plant selection recommendation may be further determined based on answers input by the user on a user interface of personal computer 910 in response to interview questions propounded by client software 912, for example, preferred color, size, price range, care-level, etc. Client software 912 may further direct the user to advertising portal 970 for identification of local retailers from which recommended plant species may be purchased and pricing information for the recommended plant species.

In some embodiments client software 912 facilitates plant health diagnostics. In these embodiments client software 912 analyzes environmental data uploaded from controller 110 and outputs a plant health diagnosis to a user on a user interface of personal computer 910. A plant heath diagnosis is output after the environmental data are compared with a species profile of a plant species installed at the site where the data were collected. A plant health diagnosis identifies incompatibilities between the environmental data and the species profile. The species profile is retrieved from one of regional plant databases 960, which may be accessed locally or remotely, based on identification of the installed plant species from information input by the user on the user interface of personal computer 910. The user may identify the installed plant species directly or the installed plant species may be identified from answers responsive to interview questions propounded by client software 912. Client software 912 may further direct the user to user forums 940 and advertising portal 970 for troubleshooting health problems with the installed plant. Advertising portal 970 may provide local plant care information, including identification of local retailers, landscape architects, landscapers and purchasing information for plant care products and tools.

In some embodiments client software 912 facilitates real-time plant health monitoring including outputting of a visual and/or audible alert. In these embodiments client software 912 downloads to controller 110 a species profile for an installed plant. Probe 100 is then installed proximate the installed plant. An alert is output by controller 110 when environmental data collected by probe 100 are found incompatible with the species profile. The species profile is retrieved by client software 912 from one of regional plant databases 960, which may be accessed locally or remotely, based on identification of the installed plant species from information input by the user on the user interface of personal computer 910. The user may identify the installed plant species directly or the installed plant species may be identified from answers responsive to interview questions propounded by client software 912.

Naturally, a plant selection and health maintenance system in some embodiments of the invention supports more than one of plant selection, plant health diagnostics and real-time plant health monitoring. In these embodiments client software 912 allows a user to choose on a user interface of personal computer 910 a desired mode from among various supported modes of system operation.

Client software 912 may perform additional functions, for example, displaying environmental data uploaded from controller 110 and species profiles in a user-friendly format, displaying comparisons of environmental data with species profiles, highlighting periods of time where environmental parameters were out of profile and providing a research tool for home gardeners and horticulture professionals.

Figure 10:
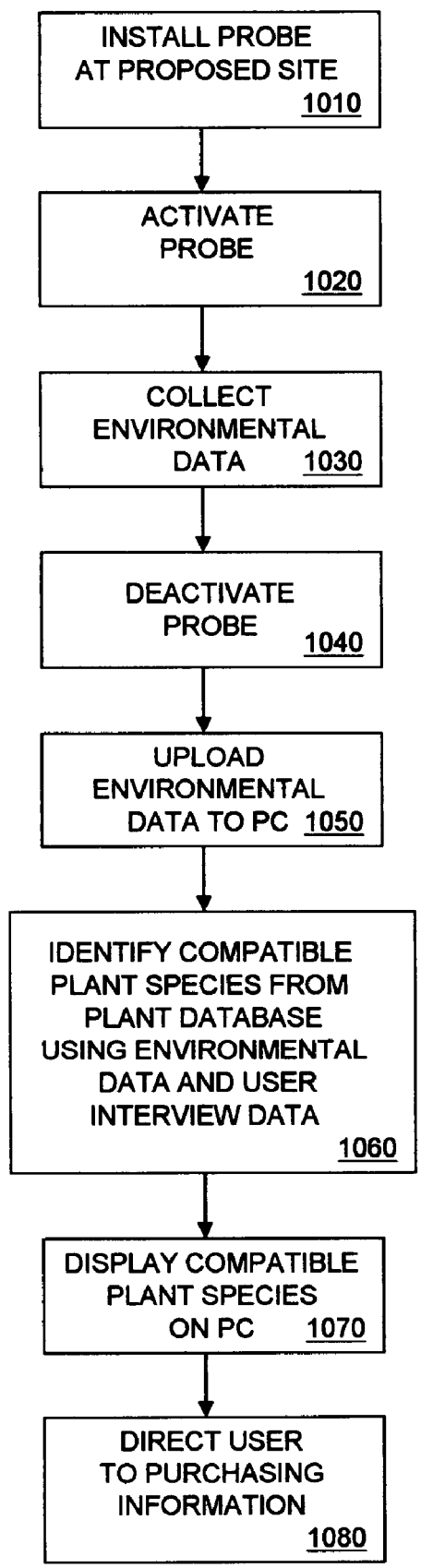
FIG. 10 is a flow diagram of a computerized plant selection system in one embodiment of the invention.

Turning to FIG. 10, a flow diagram of a computerized plant selection system in one embodiment of the invention is shown. Initially, probe 100 is installed at a proposed site for a plant (1010). Probe 100 is activated by depressing on/off button 610 (1020) which prompts probe 100 to power-up and start collecting and processing environmental data (1030). Probe 100 is then deactivated by depressing on/off button 610 (1040) which prompts probe 100 to power-down. Deactivation may occur a predetermined time after activation, typically a number of days. Controller 110 is then removed from probe 100 and plugged into personal computer 910 for upload of the environmental data (1050). Client software 912 invokes one of regional plant databases 960 to determine various plant species compatible with the environmental data and user interview data (1060) and the compatible plant species are displayed on a user interface of personal computer 910 (1070). Client software 912 then directs the user to advertising portal 970 for purchasing information (1080).

Steps 1060 through 1080 proceed in one embodiment as follows. Client software 912 executing on a microprocessor in personal computer 910 analyzes the uploaded environmental data for each monitored environmental characteristic (e.g. light, temperature, humidity, soil moisture, soil pH) and classifies the proposed plant site by generating selection parameter values. Attendant to site classification, client software 912 may perform data correction functions, such as filtering of spurious data and unit conversions. Moreover, client software 912 may generate and cause to be displayed on the user interface, attendant to or independent of site classification, charts showing the recorded values of one or more monitored environmental parameters over time, with or without reference to the selection parameters.

After site classification, client software 912 accesses one or more local, for example, on a hard drive of personal computer 910, or online regional plant databases 960 selected based on the user's geographic location to identify plant species that are environmentally compatible with the selection parameter values. Answers provided by the user in response to interview questions propounded by client software 912 may also be used, for example, to prune the list of environmentally compatible plant species into a smaller list. For example, client software 912 may ask the user for color preferences, watering schedule preferences, ease of care preferences, etc. to winnow the list of environmentally compatible candidates. The resultant compatible plant species are displayed on the user interface of personal computer 910. Client software 912 may then direct the user to advertising portal 970 for purchasing information. Purchasing information may include, for example, contact information for retailers within the user's geographic reach that have one or more of the recommended plant species in stock and pricing information.

Figure 11:
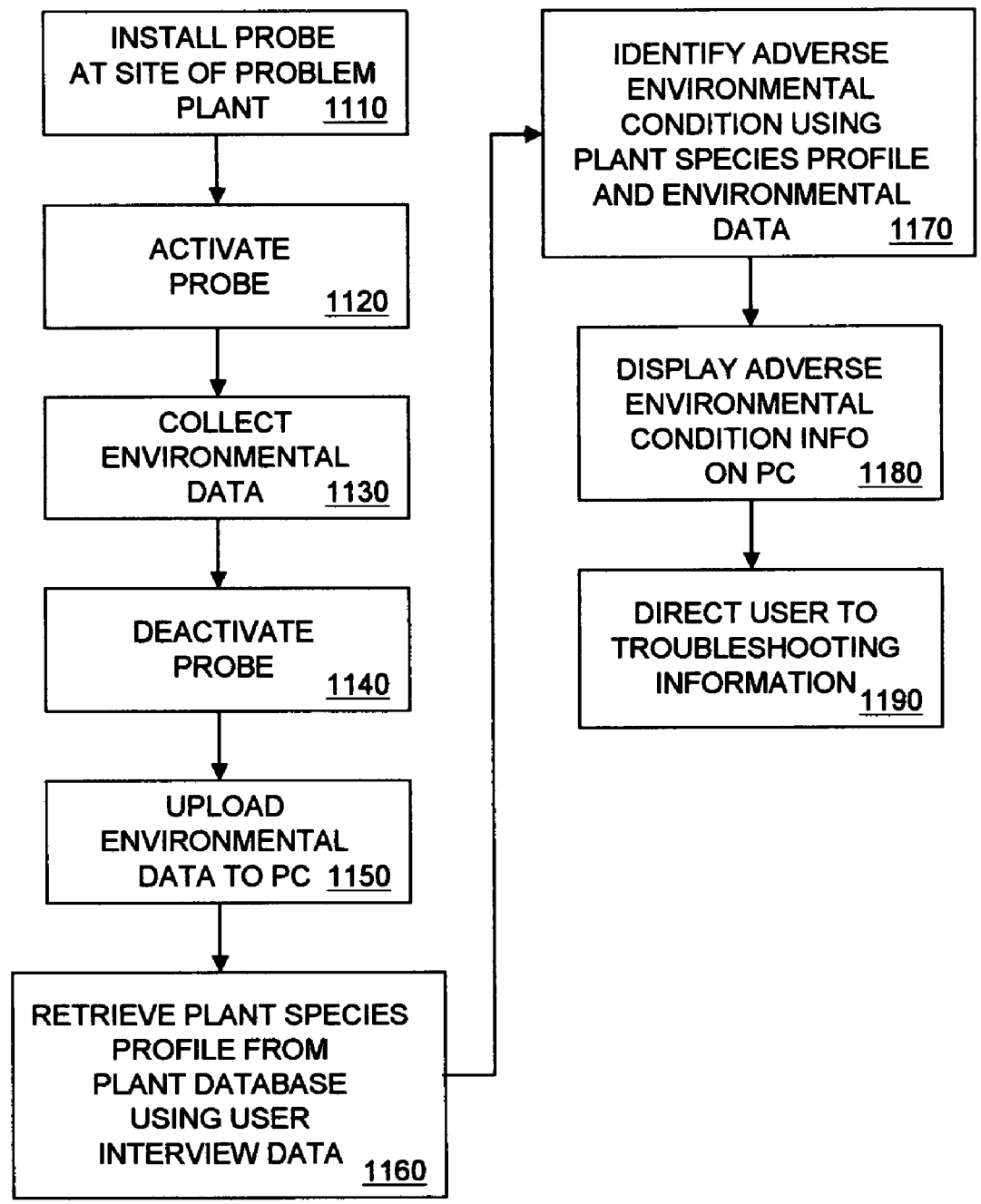
FIG. 11 is a flow diagram of a computerized plant health diagnostics system in one embodiment of the invention.

Turning now to FIG. 11, a flow diagram of a computerized plant diagnostics system in one embodiment of the invention is shown. Initially, probe 100 is installed at a site of an installed plant that has been experiencing poor health (1110). Probe 100 is activated by depressing on/off button 610 (1120)

which prompts probe 100 to power-up and start collecting and processing environmental data (1130). Probe 100 is then deactivated by depressing on/off button 610 (1140) which prompts probe 100 to power-down. Deactivation may occur a predetermined time after activation, typically a number of days. Controller 110 is then removed from probe 100 and plugged into personal computer 910 for upload of the environmental data (1150). Client software 912 conducts an interview with the user on a user interface of personal computer 910 and retrieves a species profile for the installed plant from one of regional plant databases 960 based on user interview data (1160). The user may identify the installed plant species directly through an input on the user interface or the installed plant species may be identified from answers responsive to interview questions propounded by client software 912 on the user interface. Client software 912 identifies an environmental condition adverse to health of the installed plant by comparing the environmental data against the species profile (1170) and information on the adverse environmental condition is displayed on the user interface of personal computer 910 (1180). Client software 912 then directs the user to user forums 940 and/or advertising portal 970 for troubleshooting information for improving the health of the installed plant (1190). For example, client software 912 may direct the user to user forums 940 for technical information on how to cure the plant and may direct the user to advertising portal 970 for plant care product and service information. Plant care product and service information may include identification of local retailers, landscape architects, landscapers and purchasing information for plant care products and tools, for example, fertilizers and nutrients, that can used in curing the plant.

Figure 12:
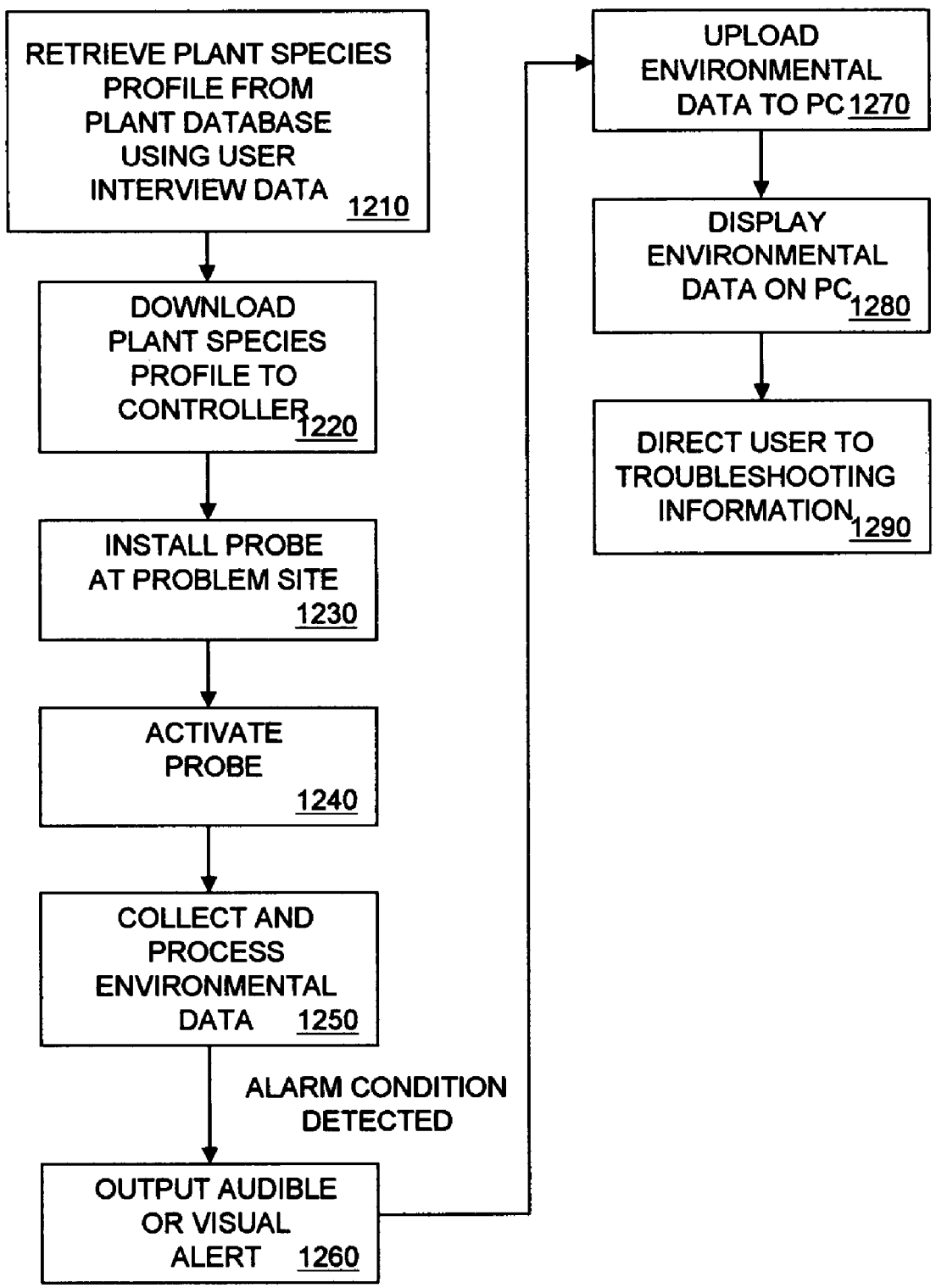
FIG. 12 is a flow diagram of a computerized real-time plant health monitoring system in one embodiment of the invention.

Referring to FIG. 12, a flow diagram of a real-time plant health monitoring system in one embodiment of the invention is shown. Initially, client software 912 conducts an interview with the user on a user interface of personal computer 910 and retrieves a species profile for an installed plant from one of regional plant databases 960 based on user interview data (1210). The user may identify the installed plant species directly through an input on the user interface or the installed plant species may be identified from answers responsive to interview questions propounded by client software 912 on the user interface. Controller 110 is connected to personal computer 910 and the species profile is downloaded to controller 110 (1220). Controller 110 is disconnected from personal computer 910 and installed in probe 100. Probe 100 is installed at a site of a plant (1230). Probe 100 is activated by depressing on/off button 610 (1240) which prompts probe 100 to power-up and start collecting and processing environmental data (1250). Controller 110 checks continually for an environmental condition adverse to health of the installed plant by comparing the environmental data against the downloaded species profile. If an adverse environmental condition is detected, controller 110 outputs an audible and/or visual alert on loudspeaker 870 and/or status display 650 (1260). In response to an audible and/or visual alert, the user re-connects controller 110 to personal computer 910. Client software 912 uploads the environmental data (1270) and displays the environmental data on a user interface of personal computer 910 (1280). Alternatively, client software 912 may upload information regarding the adverse environmental condition detected by controller 110. Client software 912 then directs the user to user forums 940 or advertising portal 970 for information on how to improve the health of the installed plant (1290). In some embodiments controller 110 may output a distinct alarm for an adverse environmental condition, for example, a distinct display color or pulse frequency or audio tone that indicates soil moisture is insufficient and the plant needs water, to enable a user to correct the condition without reconnecting controller 110 to personal computer 910.

Figure 13:
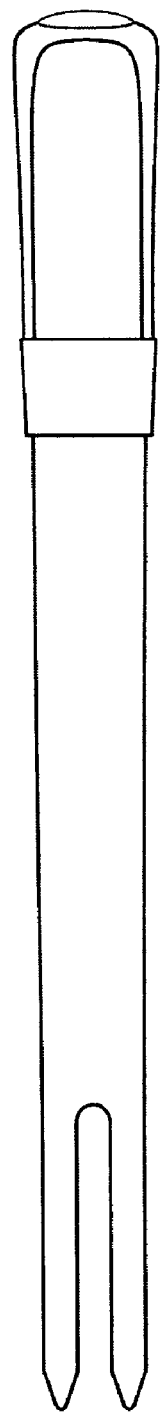
FIG. 13 is a front view of a probe adapted for use in a computerized plant selection and health maintenance system in another embodiment of the invention.
Figure 14:
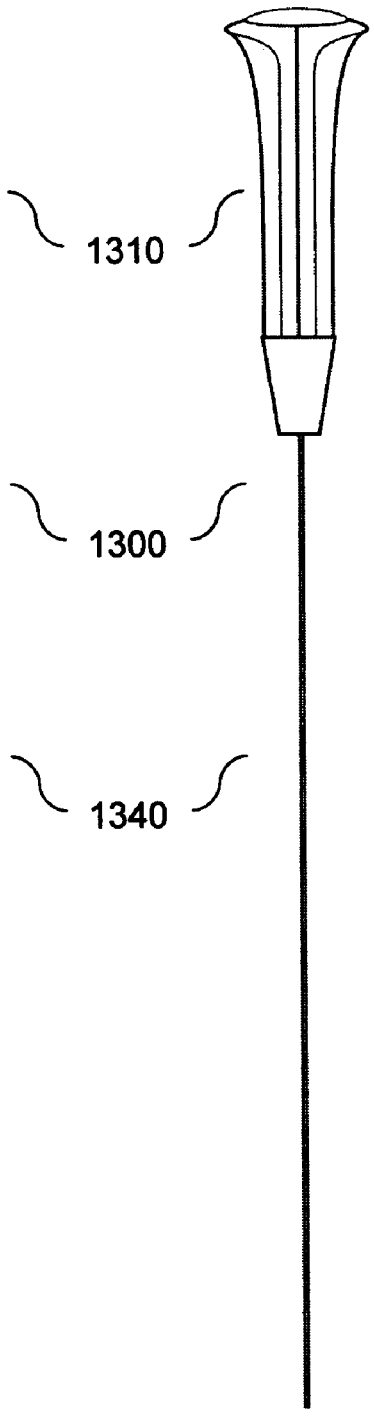
FIG. 14 is a side view of such a probe.
Figure 15:
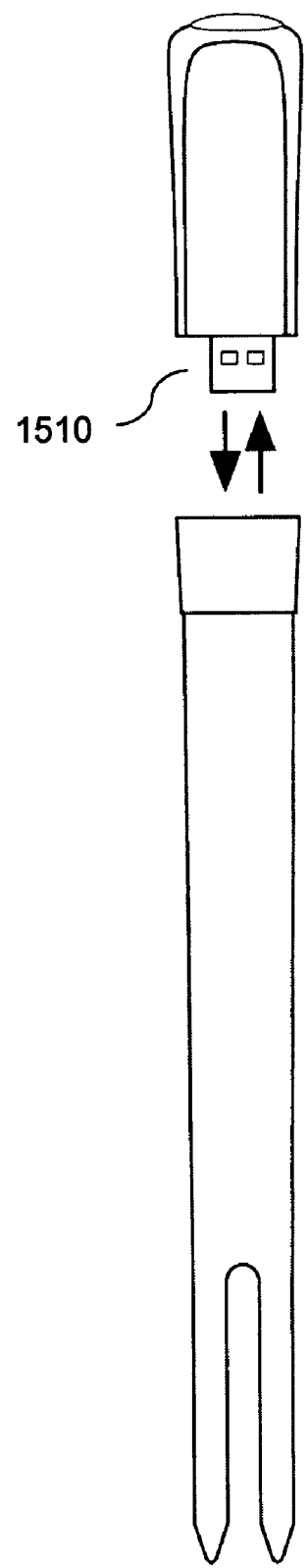
FIG. 15 is an exploded view of such a probe illustrating how it is assembled.

FIGS. 13 through 15 show a probe 1300 for use in plant selection, plant health diagnostics and real-time monitoring in another embodiment of the invention. Probe 1300 has a modular design that permits easy assembly and disassembly and enhances the portability of a controller 1310 which houses data, interfaces and logic critical to system operation and which is physically transported during system operation between probe 1300 and a personal computer. Modular elements of probe 1300 are shown in FIGS. 13 through 15 to include controller 1310 and a soil mount 1340. Probe 1300 has a minimalist look that appeals to the modern aesthetic.

Soil mount 1340 has a receptacle projecting upward therefrom and a two-pronged stake projecting downward therefrom. The receptacle has an interior cross section and a depth that match the exterior cross section and depth of a USB connector 1510 that projects downward from the bottom of controller 1310 such that controller 1310 snugly engages with soil mount 1340 when USB connector 1510 is slid into the receptacle. The snug fit between controller 1510 and soil mount 1340 helps prevent moisture and other contaminants from reaching electronic components of controller, such as USB connector 1510. When installed in a natural environment, probe 1300 is mounted by pushing the prongs through the surface of the ground near the actual or prospective location of a plant. In some embodiments, probe 1300 has a depth mark indicating the user a recommended depth to which probe 1300 should be submerged.

When installed in a natural environment, controller 1310 is exposed to direct sunlight that can heat controller 1310 well above ambient temperature and can cause the temperature and humidity sensors of controller 1310 to record incorrect measurements much different than ambient. In some embodiments, controller 1310 mathematically corrects for above-ambient temperature readings and below-ambient humidity readings by reference to measurements made by a light sensor of controller 1310. Particularly, controller 1310 runs an algorithm that adjusts temperature readings downward and humidity readings upward as a function of light intensity and duration readings taken by the light sensor.

It will be appreciated by those of ordinary skill in the art that the invention can be embodied in other specific forms without departing from the spirit or essential character hereof. For example, in other embodiments probe 100, 1300 may have a general purpose microprocessor and a graphical user interface and client software 912 and, optionally, one of regional plant databases 960 may run on probe 100, 1300. In still other embodiments data may be exchanged between probe 100, 1300 and personal computer 910 over a wireless communications interface via a wireless communication protocol. The present description is therefore considered in all respects to be illustrative and not restrictive. The scope of the invention is indicated by the appended claims, and all changes that come within the meaning and range of equivalents thereof are intended to be embraced therein.

What is claimed is:

1. A computerized plant performance optimization system, comprising:
   a computer;
   a soil mount; and
   a portable controller having a connector, wherein the controller is engageable with the soil mount to shield the connector from environmental contaminants and enable collection of environmental data sensed at a plant site, wherein the controller is connectable to the computer using the connector while disengaged from the soil mount to enable uploading of collected environmental data from the controller to the computer, wherein the computer uses uploaded environmental data from the controller to recommend one or more compatible plant species for the plant site, wherein the uploaded environmental data comprise light intensity, temperature and humidity data and wherein the temperature data are adjusted as a function of the light intensity data.

2. The system of claim 1, wherein the computer has client software executable thereon that supports a plurality of plant performance optimization modes including a plant selection mode in which based at least in part on the uploaded environmental data the computer recommends the compatible plant species and a plant health diagnostics mode in which based at least in part on environmental data uploaded from the controller the computer identifies an adverse environmental condition at a plant site, wherein the client software is further executable thereon to allow a user of the system to select an operative mode from among the plurality of supported modes.

3. The system of claim 1, wherein the computer has client software executable thereon that supports a plurality of plant performance optimization modes including a plant selection mode in which based at least in part on the uploaded environmental data the computer recommends the compatible plant species and a real-time plant health monitoring mode in which the controller outputs an alert at a plant site based at least in part on environmental data downloaded from the computer to the controller, wherein the client software is further executable thereon to allow a user of the system to select an operative mode from among the plurality of supported modes.

4. The system of claim 1, wherein the uploaded environmental data further comprise soil moisture data.

5. The system of claim 1, wherein the uploaded environmental data further comprise soil pH data.

6. The system of claim 1, wherein the controller is activated by depressing a power button on the controller.

7. The system of claim 1, wherein the connector is a USB connector connectable to the computer by mating the connector with a USB interface on the computer.

8. A computerized plant performance optimization system, comprising:
 a computer;
 a soil mount; and
 a portable controller having a connector, wherein the controller is engageable with the soil mount to shield the connector from environmental contaminants and enable collection of environmental data sensed at a plant site, wherein the controller is connectable to the computer using the connector while disengaged from the soil mount to enable uploading of collected environmental data from the controller to the computer, wherein the computer uses uploaded environmental data from the controller to recommend one or more compatible plant species for the plant site, wherein the uploaded environmental data comprise light intensity, temperature and humidity data and wherein the humidity data are adjusted as a function of the light intensity data.

9. A portable controller for a computerized plant performance optimization system, comprising:
 a memory; and
 a connector, wherein the controller is engageable with a soil mount to shield the connector from environmental contaminants and enable storing in the memory of environmental data sensed at a plant site, wherein the controller is connectable to a computer using the connector while disengaged from the soil mount to enable uploading of collected environmental data from the memory to the computer for application by the computer in recommending one or more compatible plant species for the plant site, wherein the uploaded environmental data comprise light intensity, temperature and humidity data, and wherein the temperature data are adjusted as a function of the light intensity data.

10. The controller of claim 9, wherein the uploaded environmental data further comprise soil moisture data.

11. The controller of claim 9, wherein the uploaded environmental data further comprise soil pH data.

12. The controller of claim 9, wherein the controller is activated by depressing a power button on the controller.

13. The controller of claim 9, wherein the connector is a USB connector connectable to the computer by mating the connector with a USB interface on the computer.

14. A portable controller for a computerized plant performance optimization system, comprising:
 a memory; and
 a connector, wherein the controller is engageable with a soil mount to shield the connector from environmental contaminants and enable storing in the memory of environmental data sensed at a plant site, wherein the controller is connectable to a computer using the connector while disengaged from the soil mount to enable uploading of collected environmental data from the memory to the computer for application by the computer in recommending one or more compatible plant species for the plant site, wherein the uploaded environmental data comprise light intensity, temperature and humidity data, and wherein the humidity data are adjusted as a function of the light intensity data.

15. A computerized plant recommendation method, comprising the steps of:
 collecting by a probe environmental data at a plant site;
 determining by a computer one or more compatible plant species for the plant site using the environmental data, wherein the environmental data comprise temperature data and light data and the temperature data are adjusted as a function of the light data; and
 displaying on a user interface of the computer information on the compatible plant species.

16. A computerized plant recommendation method, comprising the steps of:
 collecting by a probe environmental data at a plant site;
 determining by a computer one or more compatible plant species for the plant site using the environmental data, wherein the environmental data comprise humidity data and light data and the humidity data are adjusted as a function of the light data; and
 displaying on a user interface of the computer information on the compatible plant species.

* * * * *